(12) United States Patent
Ikebe et al.

(10) Patent No.: US 6,243,355 B1
(45) Date of Patent: Jun. 5, 2001

(54) DISK CARTRIDGE WITH ERROR INSERTION PREVENTION MECHANISM

(75) Inventors: Masaru Ikebe; Masatoshi Okamura, both of Nagano (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/225,224

(22) Filed: Jan. 4, 1999

(30) Foreign Application Priority Data

Jan. 9, 1998 (JP) .................................................. 10-13509
Apr. 1, 1998 (JP) ................................................ 10-104219

(51) Int. Cl.$^7$ ................................................... G11B 23/03
(52) U.S. Cl. .......................................... 369/291; 360/133
(58) Field of Search ..................................... 369/291, 290, 369/289, 272, 282, 273; 360/133, 131, 132

(56) References Cited

U.S. PATENT DOCUMENTS

| | | | |
|---|---|---|---|
| 4,851,948 | * 7/1989 | Kato et al. ............................. | 360/133 |
| 4,908,817 | * 3/1990 | Sandell et al. ........................ | 369/291 |
| 5,048,008 | * 9/1991 | Haruna .................................. | 369/291 |
| 5,072,326 | * 12/1991 | Ikeba et al. ........................... | 360/133 |
| 5,530,691 | * 6/1996 | Fujisawa ............................... | 369/291 |
| 5,579,297 | * 11/1996 | Childers et al. ...................... | 369/291 |
| 5,786,969 | * 7/1998 | Fukushima et al. .................. | 360/133 |

FOREIGN PATENT DOCUMENTS

| | | |
|---|---|---|
| 0 255 185 | 2/1988 | (EP) . |
| 0 335 461 | 10/1989 | (EP) . |
| 5-4752 | 1/1993 | (JP) . |
| 7-66618 | 7/1995 | (JP) . |

* cited by examiner

Primary Examiner—David L. Ometz
Assistant Examiner—Tianjie Chen
(74) Attorney, Agent, or Firm—Oblon, Spivak, McClelland, Maier & Neustadt, P.C.

(57) ABSTRACT

A disk cartridge is constituted by a case for holding a disklike medium therein, a slidable shutter, and a coil spring. The case has an upper case and a lower case coupled together. The upper case and the lower case is provided with a hole for inserting a record-playback head and a hole for inserting a driving shaft. The slidable shutter is substantially U-shaped in cross section, and exposes and blocks up the openings. The shutter is formed of a left-side shutter and a right-side shutter. The coil spring is stretched between retaining portions provided to the sliders of the respective left- and right-side shutters in order to urge the left- and right-side shutters in the direction of bringing both shutters close to each other. The left- and right-side shutters are abutted each other to block up the opening by the urging force of the coil spring. The left- and right-side shutters are slid in the direction of parting both shutters from each other against the tensile strength of the coil spring in order to expose the openings.

4 Claims, 16 Drawing Sheets

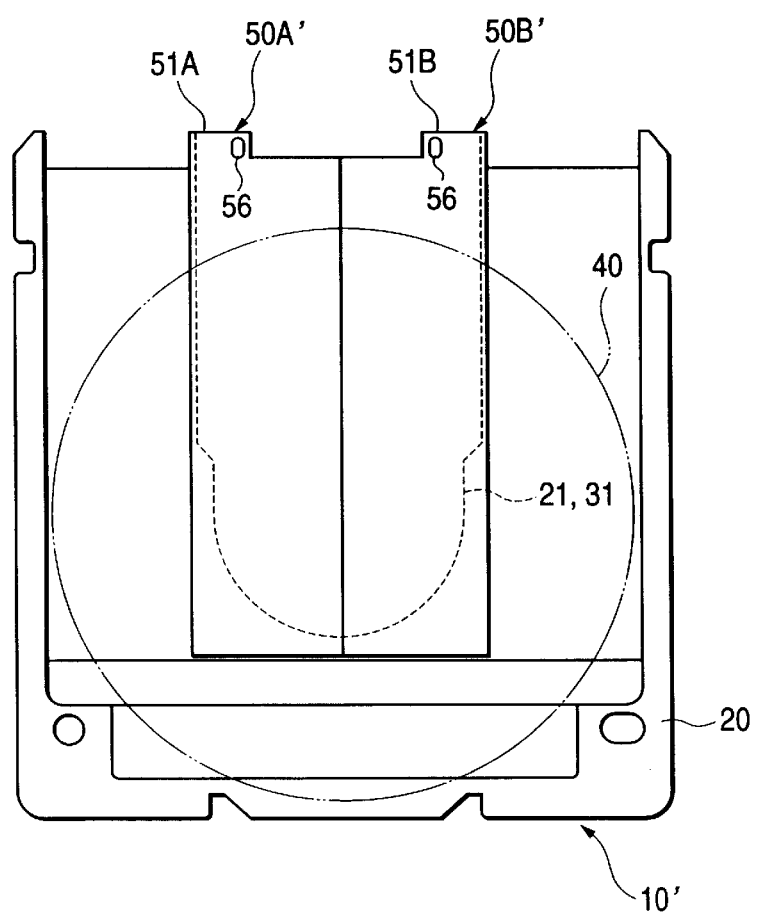
FIG. 9A
FIG. 9B

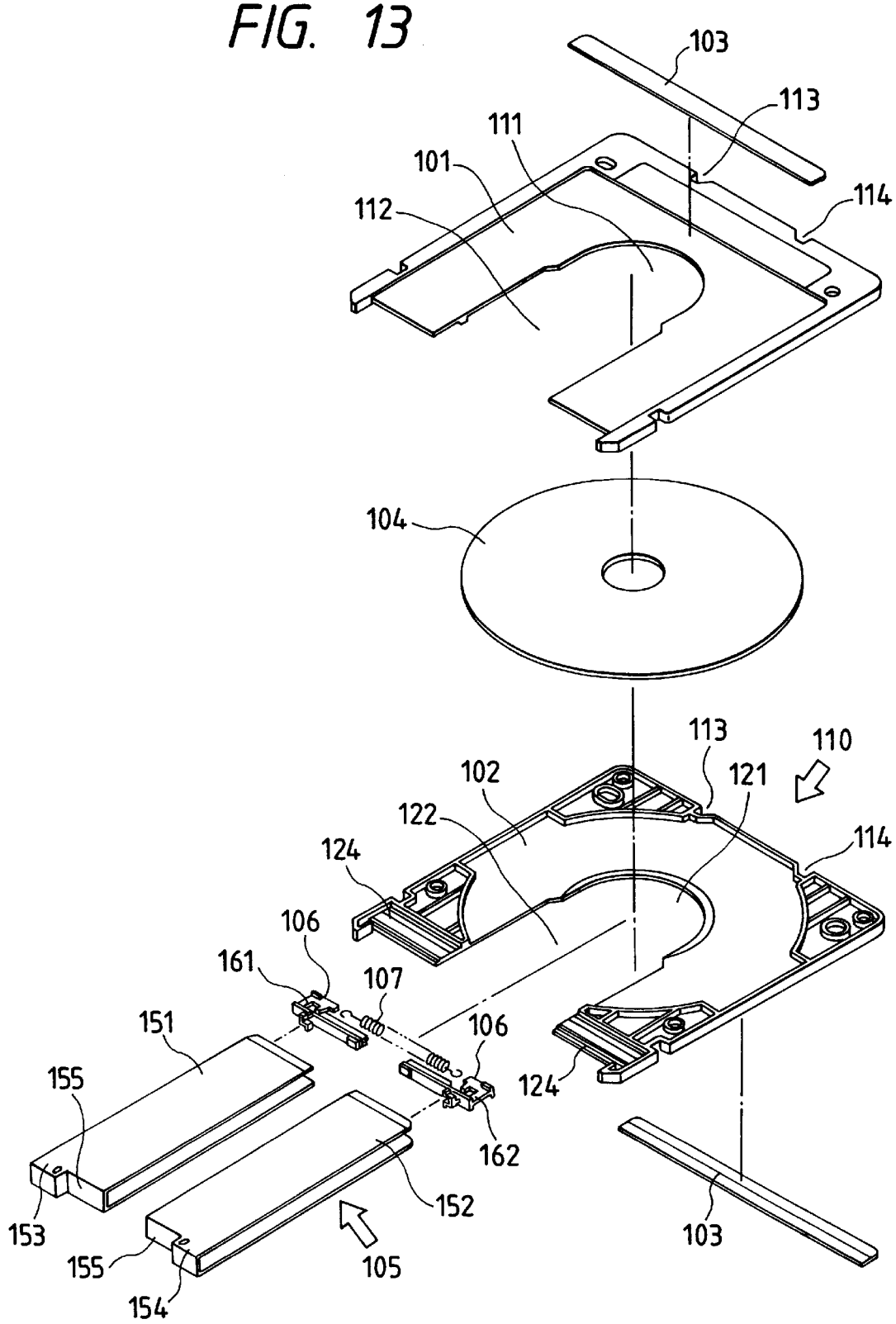

DISK CARTRIDGE WITH ERROR INSERTION PREVENTION MECHANISM

BACKGROUND OF THE INVENTION

1. Field of the Invention

The present invention relates to a disk cartridge for rotatably containing a disklike medium such as an optical disk, a magnetic optical disk and the like.

2. Description of the Related Art

Disk media such as heretofore known optical disks, magnetic optical disks and the like may be classified according to disk diameter as follows: magnetic disks of 5 inch and 3.5 inch or optical disks of 6.5 cm (MD), 8 cm (CD single), 12 cm and the like.

Of these disks, the 12-cm CD and the 8-cm CD are not different in adopting the same data storage system but only diameter. Although playback machines were initially designed to replay the 12-cm CD in a standard mode and also the 8-cm CD by additionally fitting an adaptor thereto, those machines of today are usable for replaying both the 8-cm and 12-cm CDs.

On the other hand, disk cartridges for rotatably holding a disklike medium are well known. A disk cartridge of this sort generally consists of an upper and a lower case, and slidable shutters. Each of the upper and the lower cases is formed with an opening into which a record-playback head, for example, is inserted. The slidable shutters are U-shaped in cross section and used for exposing and blocking up the respective openings.

With respect to such an optical disk of 12 cm in diameter, though what is mounted nakedly in a playback machine like a CD is already known, a DVD-RAM containing an optical disk of 12 cm in diameter in the case has recently been proposed.

When the optical disk of 12 cm in diameter (hereinafter called the "12-cm disk cartridge") is held in the case, the opening of the case is required to have a width of about 4 cm if the size of the record-playback head on the machine side is taken into consideration. Furthermore, the width of the shutter needs to be greater than at least the width of the opening of the case. When the opening is left exposed, the shutter must not be positioned above the opening. Even if the opening of 4 cm in width is formed in the 12-cm disk cartridge, a space of greater than 4 cm in width can be secured on both lateral sides of the 12-cm disk cartridge. Therefore, shutter-retracting spaces for causing the opening to be left exposed can be provided.

When the optical disk of 8 cm in diameter (hereinafter called the "8-cm disk cartridge") is held in the case, in order for the 8-cm disk cartridge to be made usable by a record-playback machine intended for the 12-cm disk cartridge, the record-playback head for the record-playback machine has to be formed so that it can be passed through the opening. In other words, an opening of 4 cm in width must be formed even in the 8-cm disk cartridge.

As the external size of the disk cartridge is desired to be smaller, it is ideal to set the breadth of the 8-cm disk cartridge at about 9 cm. However, only a space of about 2.5 cm can be secured on both sides when an opening of 4 cm in width is formed at, for example, 9 cm in breadth. This means a shutter of not less than at least 4 cm in width is needed to cover the opening of 4 cm in width and the problem is that a shutter-retracting space for use in keeping the opening exposed becomes impossible to provide.

In order to solve the above problem, it is reasoned to provide bisected double shutters as disclosed in, for example, Examined Japanese Patent Publication No. Hei 5-4752. As described in this publication, however, there develop problems arising from an increase in the number of parts and raising production cost because two pieces of guide bars have to be provided and because a spring has to be provided to each shutter. Moreover, a spring and the like in both corner portions should be arranged inside a disk cartridge arises. Accordingly, it is difficult to reduce the size of the disk cartridge. There still exists a problem in that the merit of compactness that the single-sided CD has cannot be brought out.

Most of the above-described disk cartridges have the mechanism of using only one side and as an error insertion preventive mechanism. There has been employed a method for preventing error insertion by making different the configuration of one end portion on the insertion side of such a disk cartridge. By adopting this shape, it is possible to prevent the disk cartridge from being inserted upside down by mistake and also from being inserted reversely (Examined Japanese Patent Publication No. Hei 7-66618).

If the upper and lower configurations of a conventional disklike medium capable of record-playback on both sides are set similar to each other so that a disk cartridge may be inserted upside down, the conventional mechanism of preventing the disk cartridge from being inserted reversely by mistake fails to function as what prevent such error insertion. In consequence, a groove B' is provided on both side faces close to the insertion side of a case A' as shown in FIG. 18 in order to detect the error insertion by causing the error insertion detecting member C' of a record-playback machine to engage with the groove B'.

In the case of such a detection structure, the joint between the stationary side and movable side of a mold for molding cases, for example, a parting line (hereinafter simply called the PL plane) varies. Accordingly, this not only makes the mold structure complicated but also necessitates an extra member for the error inserting preventive mechanism on the record-playback machine side. Therefore, there arises a problem of high cost.

SUMMARY OF THE INVENTION

It is an object of the present invention to provide a disk cartridge fit for use in holding a small-sized disklike medium and usable even in a record-playback machine intended for a standard-size disk cartridge without increasing the size of the disk cartridge but increasing the width of an opening into which a record-playback head or the like is inserted.

It is an object of the present invention to provide an inexpensive disk cartridge capable of carrying out an error insertion preventive function by the use of a simple mechanism when the disk cartridge is mounted in a record-playback machine reversely by mistake.

According to a first aspect of the present invention, a disk cartridge is constituted by a case for holding a disklike medium therein, a slidable shutter, and a coil spring. The case has an upper case and a lower case coupled together. The upper case and the lower case is provided with a hole for inserting a record-playback head and a hole for inserting a driving shaft. The slidable shutter is substantially U-shaped in cross section, and exposes and blocks up the openings. The shutter is formed of a left-side shutter and a right-side shutter. The coil spring is stretched between retaining portions provided to the sliders of the respective left- and right-side shutters in order to urge the left- and right-side shutters in the direction of bringing both shutters close to each other. The left- and right-side shutters are abutted each other to block up the opening by the urging force of the coil spring. The left- and right-side shutters are slid in the direction of parting both shutters from each other against the tensile strength of the coil spring in order to expose the openings.

According to a second aspect of the present invention, a disk cartridge is constituted by a case for rotatably holding a disklike medium capable of record-playback therein, a shutter, and an error insertion prevention mechanism. The case has openings into which a driving shaft and a record-playback head are inserted. The shutter is slidably mounted in the respective cases and substantially U-shaped in cross section. The shutter is formed of an upper plate, a lower plate and a coupling plate for coupling the upper and the lower plates. The error insertion prevention mechanism is formed of an engaging protruded portion provided to the coupling plate and an engaging recessed portion provided in a position corresponding to the engaging protruded portion on the side face of the case opposite to the coupling plate. The engaging protruded portion engages with a shutter on-off operating member of a record-playback machine. The engaging recessed portion receives the shutter on-off operating member of the record-playback machine.

BRIEF DESCRIPTION OF THE DRAWINGS

In the accompanying drawings:

FIGS. 9A is a plan view illustrating the disk cartridge of FIG. 8;

FIG. 9B is a side view illustrating the disk cartridge of FIG. 8;

FIG. 13 is a perspective exploded view of a disk cartridge of a third embodiment according to the present invention;

FIG. 14A being a plan view of a lower case at the time the shutters are blocked up, excluding an upper case; FIG. 14B being a plan view of the upper case at the time the shutters are blocked up; and FIG. 14C being a rear side view of the disk cartridge;

FIG. 16B being a plan view excluding an upper case; FIG. 16B being a partial perspective view;

PREFERRED EMBODIMENTS OF THE INVENTION

Preferred embodiments of the present invention will be described with reference to the accompanying drawings.

(First Embodiment)

Figure 1:
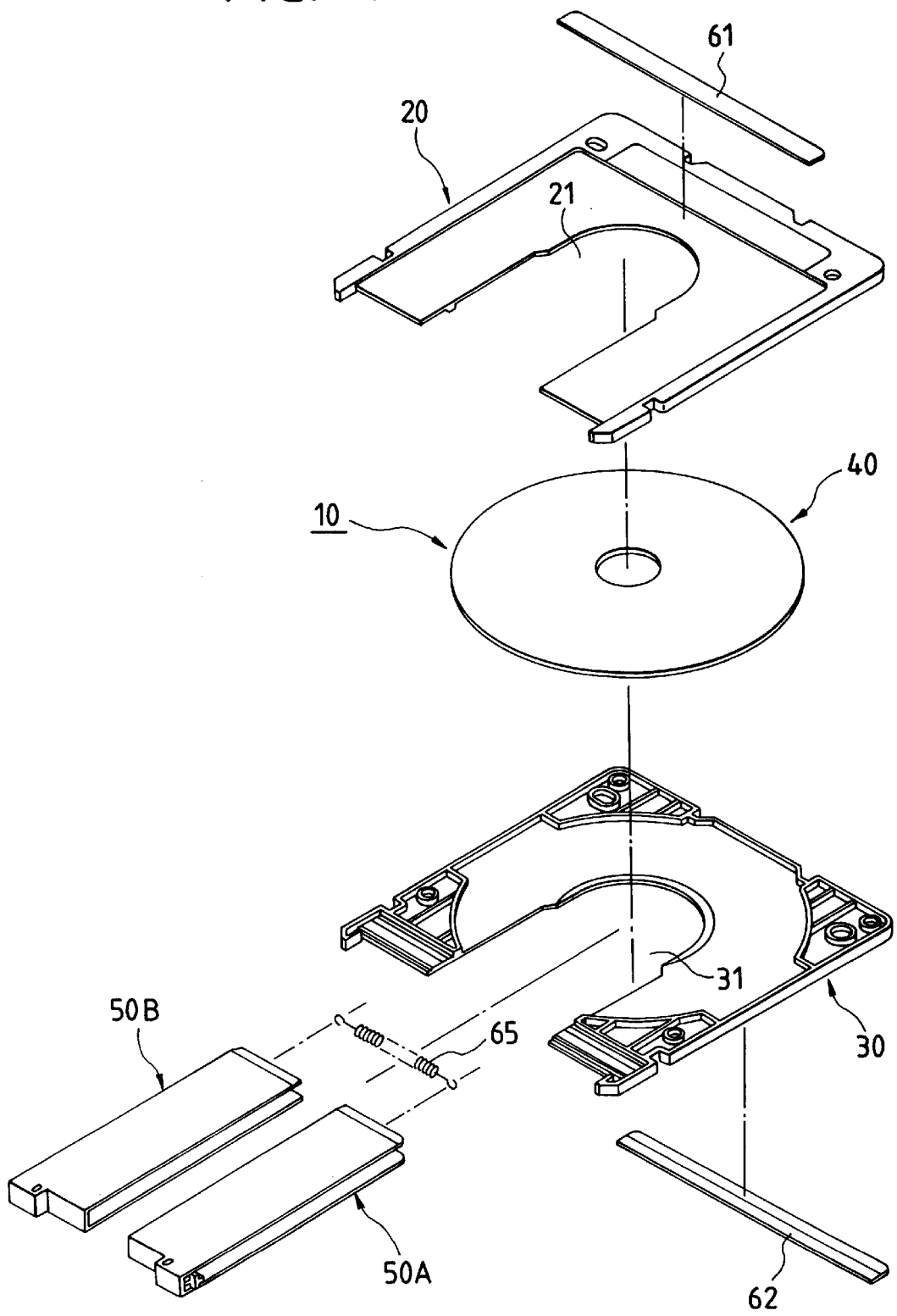
FIG. 1 is a perspective exploded view of a disk cartridge as a first embodiment of the invention.

FIGS. 1 to 7 show a disk cartridge as a first embodiment of the present invention. FIG. 1 is a perspective exploded view of the disk cartridge. As shown in FIG. 1, a disk cartridge 10 essentially consists of an upper case 20 and a lower case 30 which are coupled together and a disklike medium 40 rotatably mounted inside. The disklike medium 40 is an optical disk (more specifically, DVD) according to this embodiment, which is capable of record-playback on both sides.

The upper case 20 and the lower case 30 are provided with openings 21, 31 into which a record-playback head and a driving shaft are inserted. The driving shaft is inserted into the substantially semicircular open portion. The record-playback head is inserted into the substantially rectangular open portion of each of the openings 21, 31. As the engagement of the upper case 20 and the lower case 30, there are acrylonitrile-budadiene-styrene (ABS) copolymers or the like and both are coupled by ultrasonic fusion bonding or the like.

A shutter 50 is substantially U-shaped in cross section and formed with bisected shutters at the center of the disk cartridge 10, including a (left-side) shutter 50A and a (right-side) shutter 50B. The shutters 50A, 50B is so installed as to straddle the respective upper and lower cases 20, 30.

A coil spring 65 is a helical tension spring for urging the shutters 50A, 50B in the direction of bringing the shutters close to each other.

Guides 61, 62 are fixed to the respective upper and lower cases 20, 30 by means of fusion bonding, contact bonding or the like and used for guiding the respective lower end portions of the upper and lower plates of the shutter 50.

Although error erasure preventive plug for selectively setting data-recording enable/disable on the disklike medium 40 is not provided according to this embodiment, such a plug may be provided as occasion demands. With respect to the disklike medium 40 as what is designated to be capable of record-playback on both sides thereof according to this embodiment, the plug may be provided on both A and B sides.

Figure 2A:
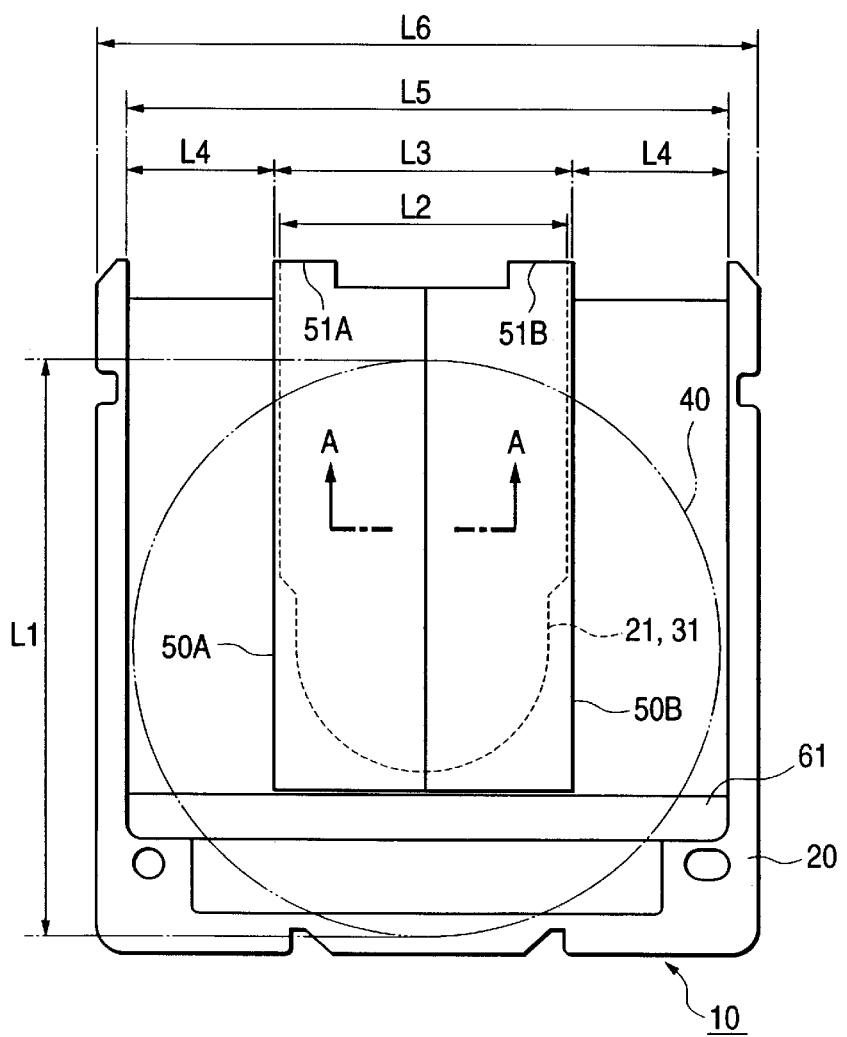
FIG. 2A is a plan view of a diagram illustrating the disk cartridge of FIG. 1.
Figure 2B:
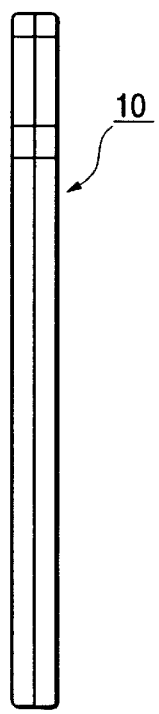
FIGS. 2B and 2C are side views of a diagram illustrating the disk cartridge of FIG. 1.
Figure 2C:
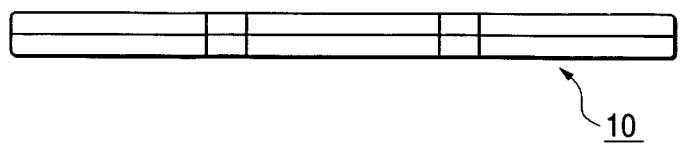

FIGS. 2A to 2C are diagrams illustrating the disk cartridge 10 of FIG. 1. FIG. 2A is a plan view thereof, and FIGS. 2B and 2C are side views.

The diameter L1 of the disklike medium 40 according to this embodiment is 8 cm like a CD single. The width L2 of the openings 21, 31 of the respective upper and lower cases 20, 30 is about 4 cm. Moreover, the shutter 50 (in such a state that the shutters 50A, 50B have been brought into contact with each other) is formed so as to cover the openings 21, 31 and its breadth L3 is about 4.1 cm, which is slightly greater than the width L2 of the openings 21, 31.

Furthermore, the breadth L6 of the disk cartridge 10 is about 9.1 cm. A slidably moving range L5 of shutters 50A, 50B is about 8.3 cm. Consequently, a slidably moving range L4 set on both lateral sides of the shutter 50 is about 2.1 cm.

When the shutter 50 is moved to the leftmost/rightmost side if the shutter 50 is made of one member, only about half the openings 21, 31 can be left exposed. According to the present embodiment, however, the shutter 50 is formed with the two parts of shutters 50A, 50B. When the openings 21, 31 are exposed, the shutters 50A, 50B are moved in the direction of parting the shutters from each other. Hence, the shutters 50A, 50B remain within the slidably moving range L4, so that the openings 21, 31 is completely exposed. In other words, a disk cartridge 10 containing a disklike medium 40 of 8 cm in diameter becomes usable in a playback machine intended for a disk cartridge holding the disklike medium of 12 cm in diameter.

Figure 3:
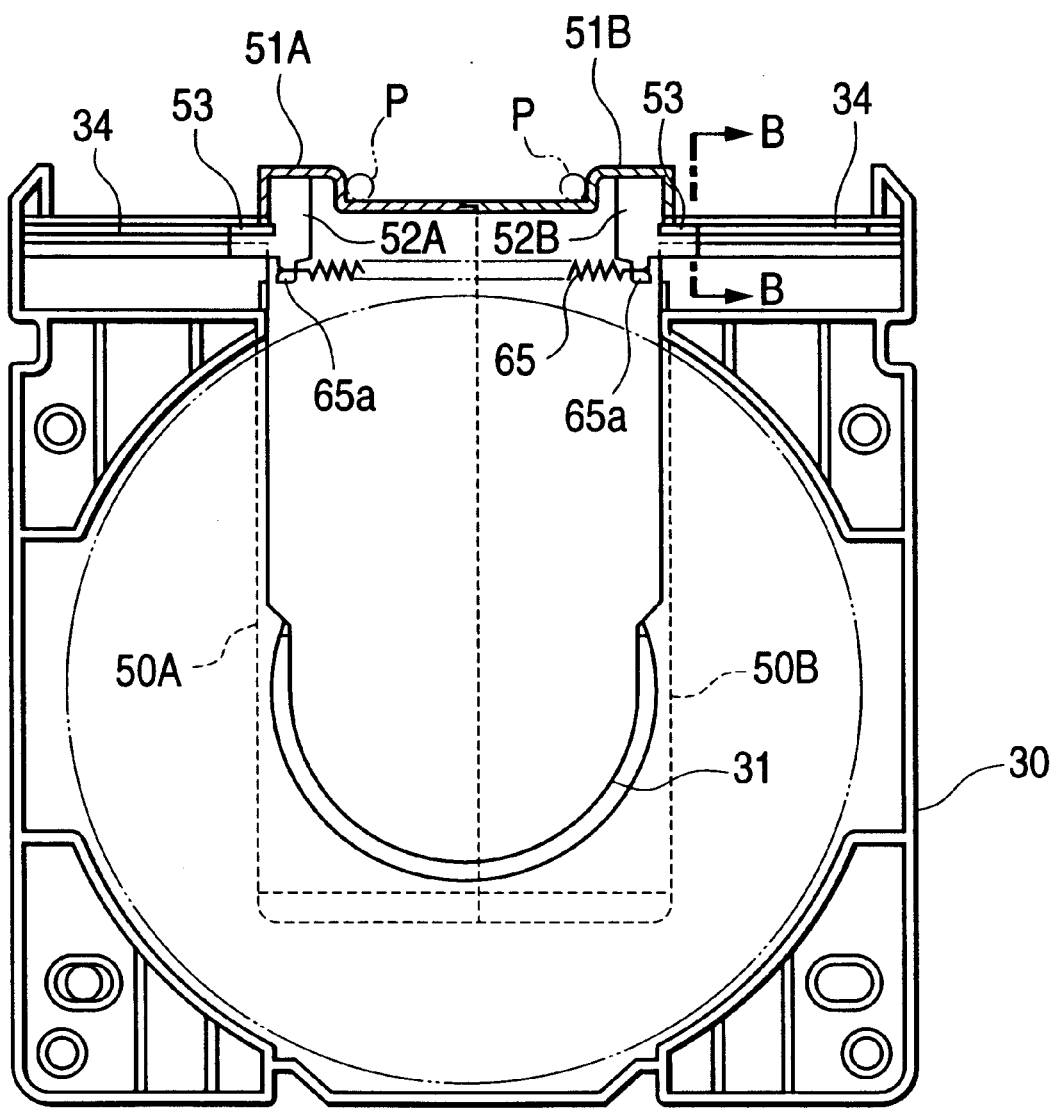
FIG. 3 is a plan view showing the situation in which a coil spring has been fitted to the shutter excluding an upper case.

FIG. 3 is a plan view showing the situation in which a coil spring 65 has been fitted to the shutter 50 excluding the upper case 20.

As shown in FIG. 3, projections 51A, 51B are provided on the left end side of the back portion of the shutter 50A and on the right end side of the back portion of the shutter 50B, respectively. Sliders 52A, 52B (52) are also formed on the inner face sides of the back portions of the respective shutters 50A, 50B. In this embodiment, the shutter 50 is a molded piece formed by injection molding or the like. The slider 52 is formed with the shutter 50 by monolithic molding. The sliders 52A, 52B are symmetrical in configuration to each other.

Figure 4:
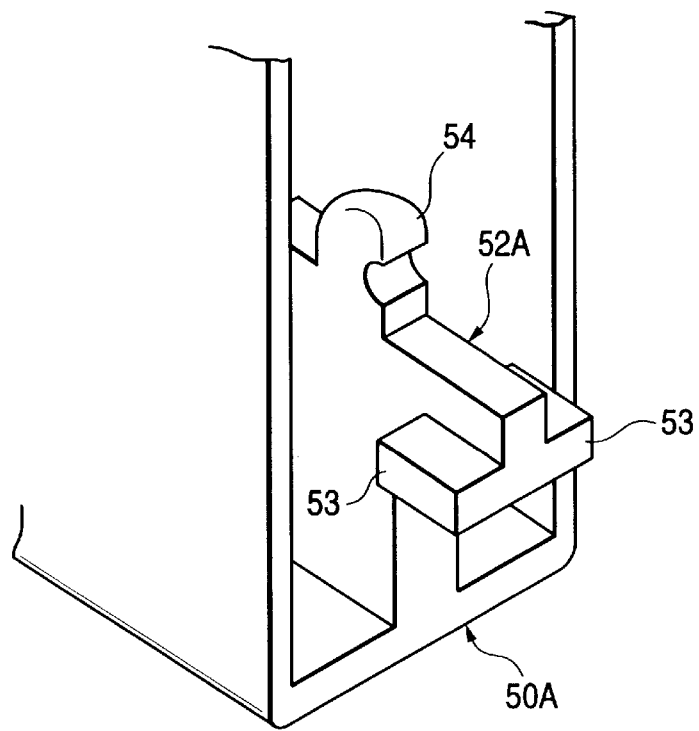
FIG. 4 is an enlarged perspective view of a shutter and a slider.
Figure 5:
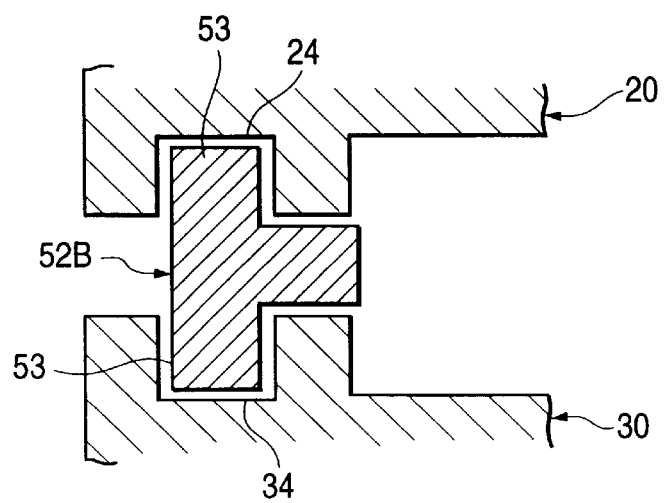
FIG. 5 is a sectional view taken on line B—B of FIG. 3 including the upper case.

FIG. 4 is an enlarged perspective view of the shutter 50A and the slider 52A in combination. FIG. 5 is a sectional view taken on ling B—B of FIG. 3 including the upper case 20.

The engaging portion 53 of the slider 52A is projected toward both the upper case 20 and the lower case 30 and adapted to engage with rail-shaped groove portions 24, 34 formed near upper outer edge portions on the inner face sides of the upper and lower cases 20, 30, respectively. Each retaining portion 54 is a portion over which a hook 65a in the leading end portion of the coil spring 65 is hooked.

When the upper case 20 and the lower case 30 are coupled together, the groove portions 24, 34 of the upper and lower cases 20, 30 are arranged opposite to each other and the engaging portion 53 of the slider 52 enters these groove portions 24, 34. Accordingly, the shutters 50A, 50B are made slidable along the respective groove portions 24, 34. When the coil spring 65 is hooked over the retaining portions 54 of the shutters 50A, 50B, moreover, the shutters 50A, 50B are urged in the direction of bringing the shutters close to each other. The coil spring 65 is positioned above and outside a region where the disklike medium 40 is placed, and its expanding and contracting direction conforms to the direction of sliding the shutter 50.

Figure 6:
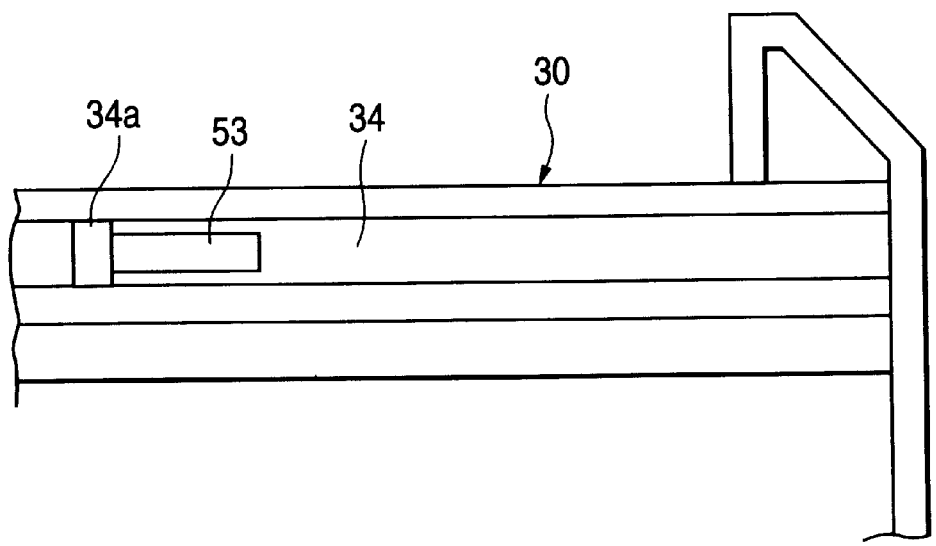
FIG. 6 is a plan view showing the relation between the groove portion of a lower case and the engaging portion of the slider.

FIG. 6 is a plan view showing the relation between the groove portion 34 of the lower case 30 and the engaging portion 53 of the slider 52. An end wall 34a for regulating the movement of the engaging portion 53 is provided on the side of the central portion of the groove portion 34. Similarly, an end wall 24a is also provided in the groove portion 24 of the upper case 20.

When the shutter 50 is positioned so that the openings 21, 31 are blocked up, the engaging portion 53 of the slider 52 is, as shown in FIG. 6, brought into contact with the end walls 24a, 34a of the respective groove portions 24, 34. Consequently, the shutters 50A, 50B are never allowed to move opposite further to the position where the openings 21, 31 are blocked up.

Figure 7:
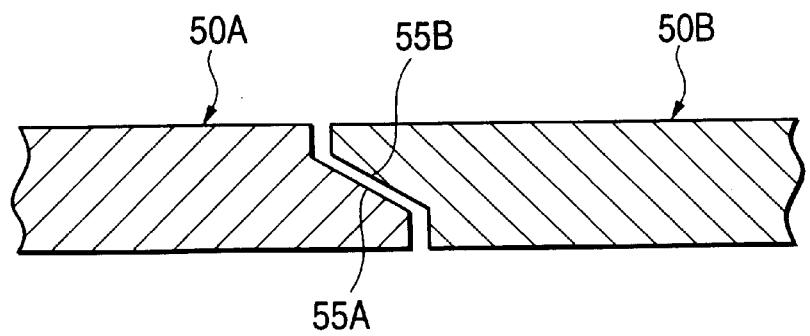
FIG. 7 is a sectional view taken on line A—A of FIG. 2.

FIG. 7 is a sectional view taken on line A—A of FIG. 2. Stepped portions 55A, 55B are formed in outer edge portions on the side of the central portions of the respective shutters 50A, 50B. When the openings 21, 31 are blocked up, the stepped portions 55A, 55B of the shutters 50A, 50B are overlapped to ensure that the openings 21, 31 are blocked up thereby. Incidentally, the outer edge portions of the shutters 50A, 50B may be caused only to abut each other instead without forming the stepped portions.

When the shutter 50 is opened, shutter opening pins P provided on the record-playback machine side are, as shown in FIG. 3, positioned on the inside of the projections 51A, 51B on the back of the respective shutters 50A, 50B in order to move the shutter opening pins P outside by abutting the respective projections. Thus, the shutters 50A, 50B are moved in the direction of parting the shutters from each other against the urging force of the coil spring 65, whereby the shutter 50 is opened. When the shutter 50 is closed, the aforesaid operation is performed reversely.

With the aforesaid arrangement, the number of parts is prevented from increasing since only the coil spring 65 is employed as an additional part necessary for opening and closing the shutter 50 by forming the shutter 50 and the slider 52 by monolithic molding. Moreover, space-saving can be attained by making the direction of expanding and contracting the coil spring 65 consistent with the direction of sliding the shutter 50 and placing the coil spring 65 above the disklike medium 40.

(Second Embodiment)

Figure 8:
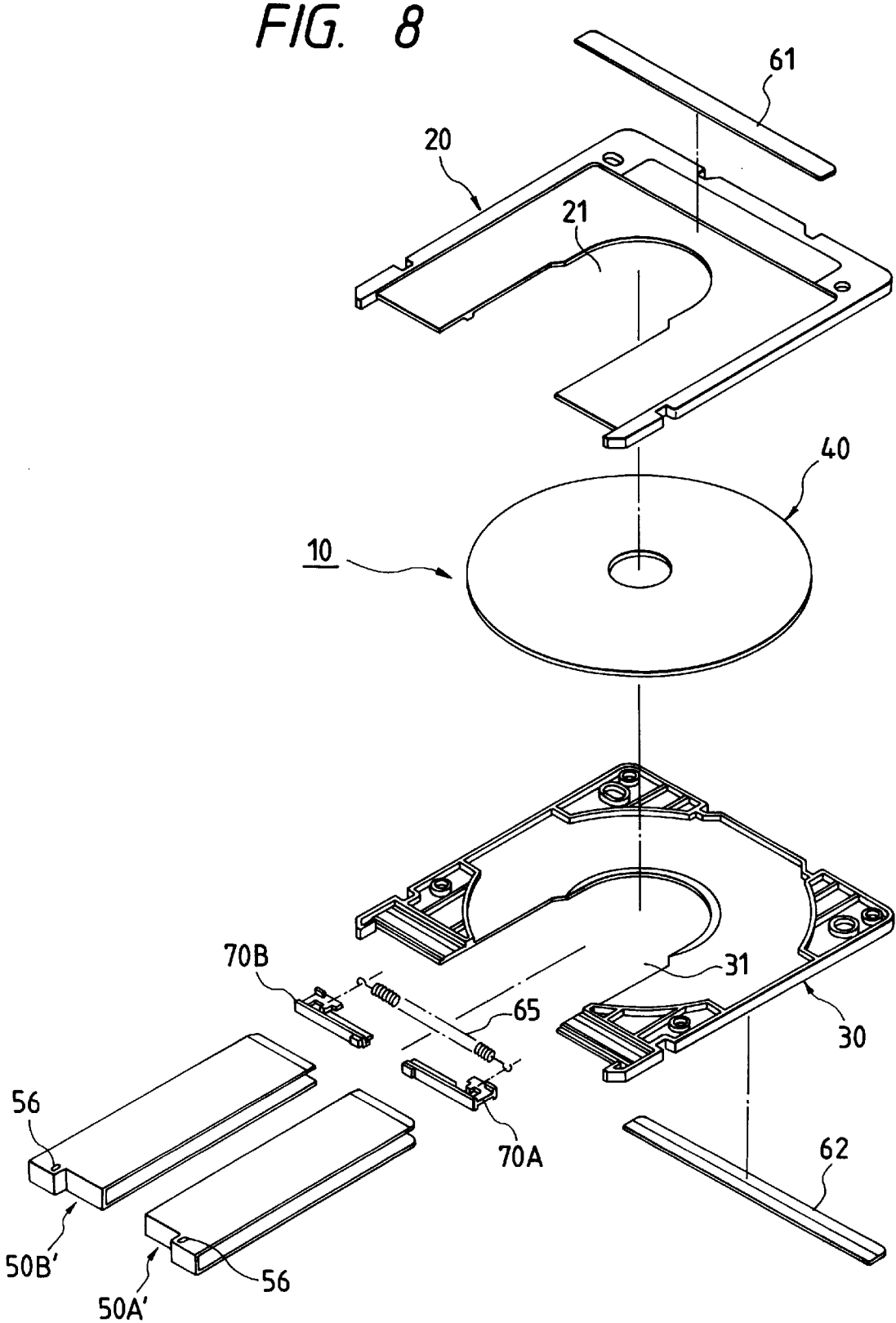
FIG. 8 is a perspective exploded view of a disk cartridge as a second embodiment of the present invention.

FIGS. 8 to 12 show a disk cartridge as a second embodiment of the invention. FIG. 8 is a perspective exploded view of the disk cartridge. FIGS. 9A and 9B are a plan view and a side view of the disk cartridge 10' of FIG. 8, respectively.

As shown in FIG. 8, the disk cartridge 10' in the second embodiment is the same as the disk cartridge 10 in the first embodiment except a slider 70 (70A, 70B) is provided.

Moreover, a shutter 50' (50A', 50B') is not provided with the slider 52 in the first embodiment. In other words, nothing is provided on the inner face side of the shutter 50'. Holes 56 into which the sliders 70A, 70B fit are formed in the shutters 50A', 50B', respectively.

Figure 10A:
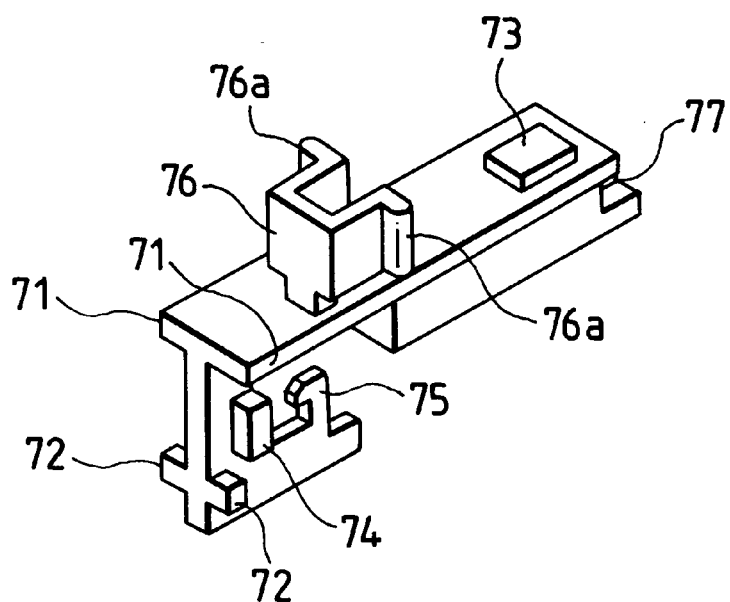
FIGS. 10A and 10B are detailed perspective view showing a slider as viewed from the left and right oblique directions, respectively.
Figure 10B:
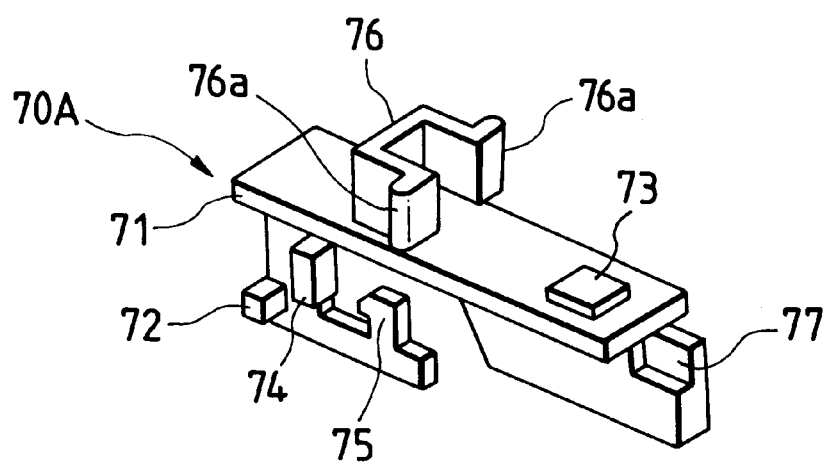
Figure 11:
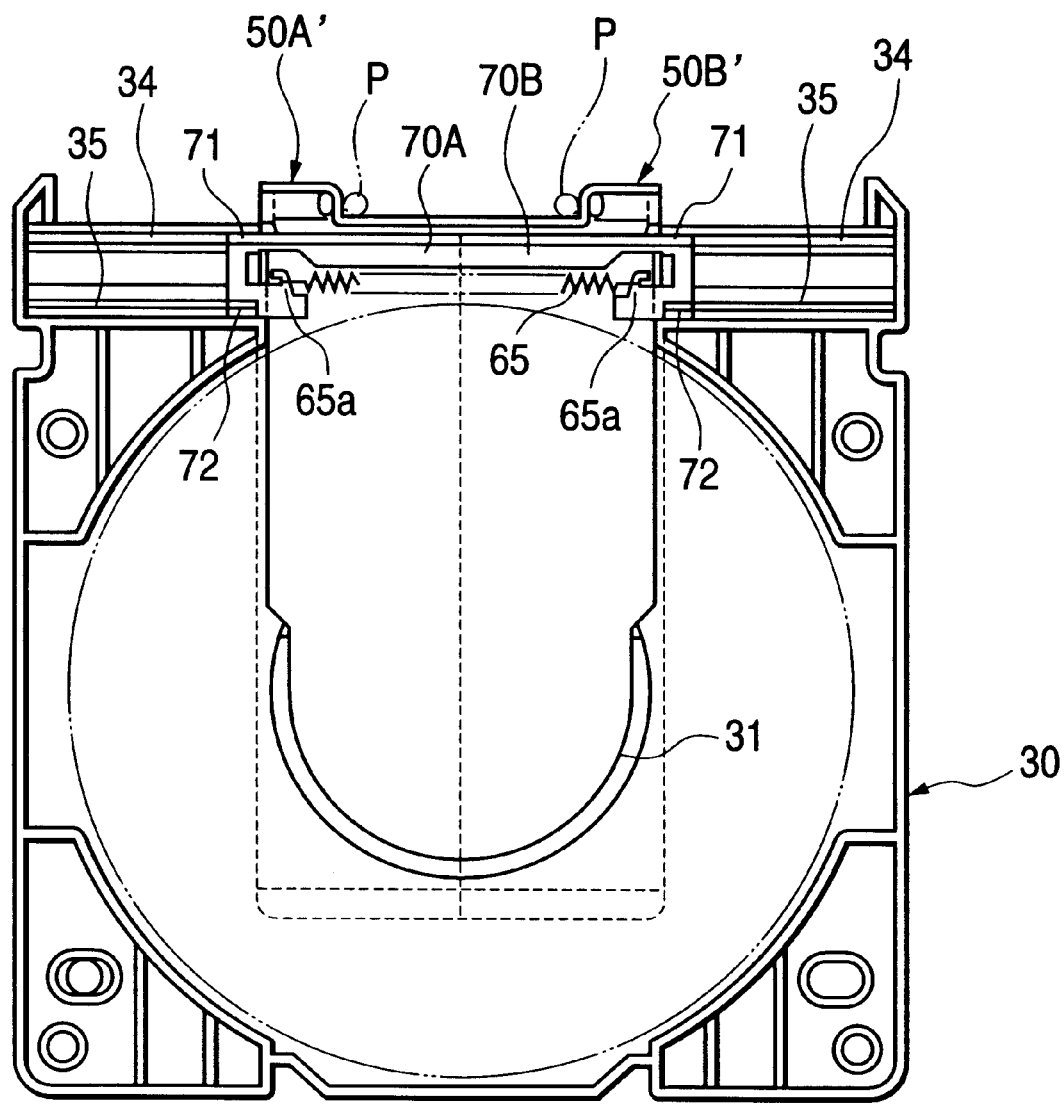
FIG. 11 is a plan view showing a state in which the slider and a coil spring have been fitted to the shutter excluding the upper case.
Figure 12:
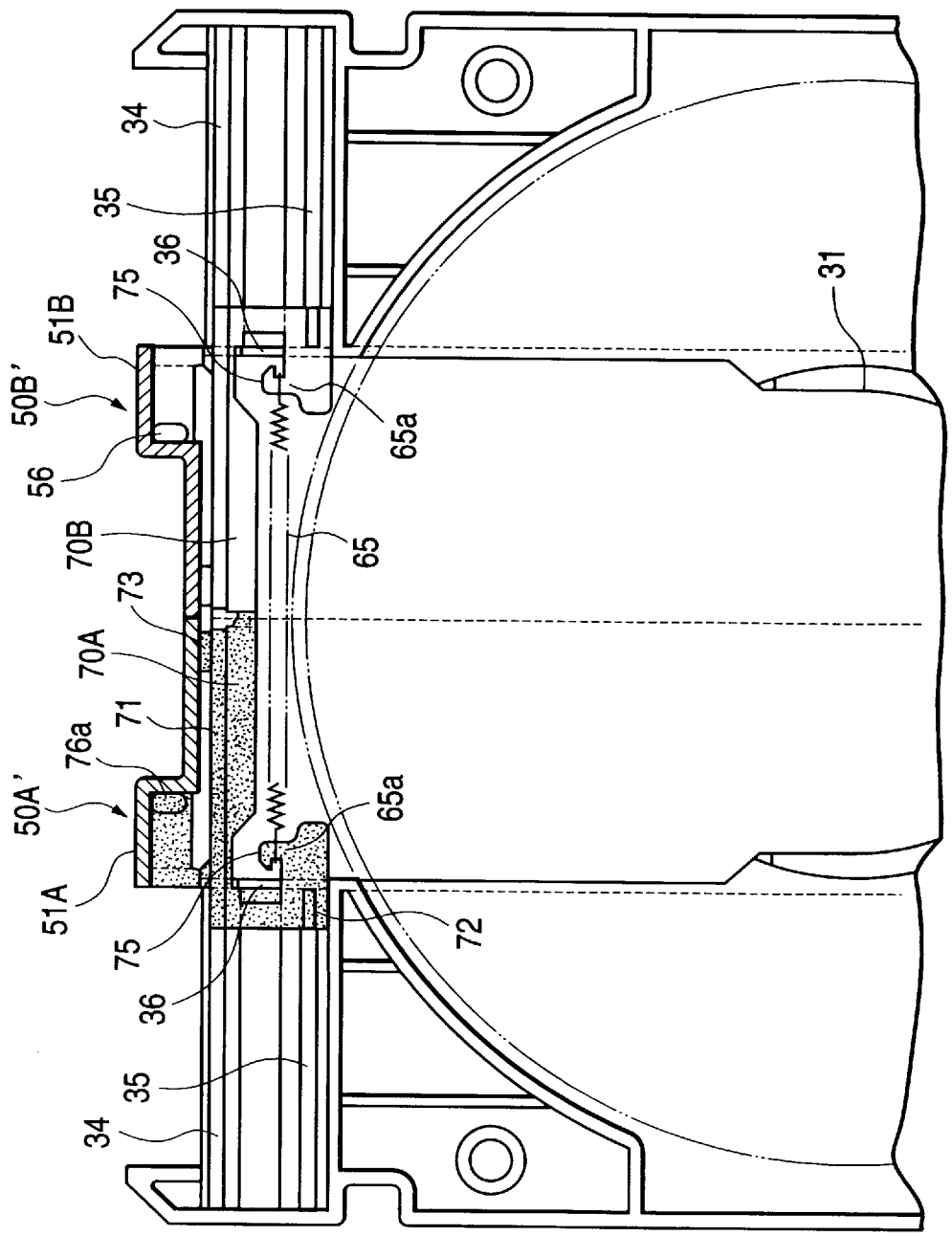
FIG. 12 is a detailed plan view showing the principal part of FIG. 11.

FIGS. 10A and 10B are detailed perspective views showing the slider 70A. FIGS. 10A and 10B are diagrams as viewed from the left and right oblique directions, respectively. Although the slider 70B is not shown in FIG. 10, the slider 70B is substantially symmetrical in configuration with the slider 70A. FIG. 11 is a plan view showing a state in which the slider 70 and the coil spring 65 are fitted to the shutter 50' excluding the upper case 20. FIG. 12 is a detailed plan view showing the principal part of FIG. 11.

The engaging portions 71, 72 of the slider 70 are engaged with rail-like groove portions 34, 35 formed in the lower case 30 as well as similar groove portions 24, 25 (not shown) also formed in the upper case 20 so as to slidably support the slider 70 in the upper and lower cases 20, 30.

A substantially U-shaped portion 76 in cross section is provided above the slider 70. A holding portion 76a projecting outside in a substantially oval form is provided in both end portions of the U-shaped portion 76. Each of the holding portions 76a is fitted into a hole 56 formed in the shutter 50', whereby to hold the slider 70 with the shutter 50'. As the substantially U-shaped portion 76 is capable of resiliently bending, the holding portion 76a can be fitted into the hole 56 of the shutter 50' by inserting the U-shaped portion toward the inner face side of the shutter 50'.

A contact portion 73 is brought into contact with the inner face side of the back portion of the shutter 50' so that the slider 70 is registered with the shutter 50'. A stopper 74 is brought into contact with a projection 36 (see FIG. 12) formed in the lower case 30 and when the shutter 50' is in the closed position. The slider 70 is so restricted as not to move further. In this case, a similar projection 36 is formed in the upper case 20.

A retaining portion 75 is hocked with the hook 65a of the coil spring 65. An engaging portion 77 is formed so that the engaging portions 77 of the sliders 70A, 70B can engage with each other when the shutter 50' is in the closed position. Thus, the disk cartridge 10' is prevented from being deformed as a twisting or bending moment is applied thereto when the engaging portions 77 engage with each other. Since the engaging portion 77 of the slider 70A is in a recessed form, the engaging portion 77 of the slider 70B becomes protruded.

The openings 21, 31 can be exposed and closed by sliding the shutter 50' in the second embodiment as in the first embodiment.

In the second embodiment, furthermore, the number of parts becomes greater by one than that in the first embodiment because the shutter 50' and the slider 70 are different members. However, the shutter 50' can easily be mounted in the upper and lower cases 20, 30. In the second embodiment, the shutter 50' can be formed of a metal plate even though the slider 70 is a molded piece.

Although a description has been given of the preferred embodiments of the present invention, the invention is not limited to those as aforesaid but may be modified in various manners.

For example, the present invention is also applicable to a disklike medium capable of record-playback on one side, though the disklike medium 40 capable of record-playback on both sides has been taken by way of example according to the embodiments.

According to the present invention, while the disk cartridge is made small-sized, the width of the open portion can be increased by effectively utilizing the slidable range of the shutters. Moreover, the double shutters can be provided without increasing the number of parts. Furthermore, it is possible to implement space-saving since the coil spring is provided between the left- and right-side shutters on the inner face side of back portion of the shutter.

Particularly, only the coil spring is employed as an additional part necessary for opening and closing the shutter by forming the shutter and the slider by monolithic molding and the number of parts is prevented from increasing. On the other hand, the use of separate parts for forming the shutter and the slider results in improving assembly efficiency.

(Third Embodiment)

According to this embodiment, the engaging protruded portions for engaging with the shutter on-off operating member of the record-playback machine are provided to the coupling plates of the shutters. The engaging recessed portions for receiving the shutter on-off operating member of the record-playback machine are provided in positions corresponding to the engaging protruded portions on the side face of the case opposite to the coupling plate of the shutter.

The protruded portions and the recessed portions function as an error insertion preventive mechanism. Even when the disk cartridge is mounted in the record-playback machine reversely by mistake, the shutter on-off operating member of the record-playback machine is inserted into the engaging recessed portions of the cases. Accordingly, the insertion of the disk cartridge is blocked to ensure that the error insertion preventive function is fulfilled with a simple mechanism.

The disk cartridge is properly mounted in the record-playback machine. At this time, the shutter on-off operating member of the record-playback machine is engaged with the engaging protruded portions provided to the coupling plates of the shutters to make the shutters slide on the cases so as to expose the openings for receiving the driving shaft and the record-playback head. In other words, when the disk cartridge is not used, the openings of the disk cartridge are blocked up by the bisected left- and right-side shutters when the disk cartridge is not used. When the disk cartridge is properly mounted in the record-playback machine, the left- and right-side shutter is caused to slide in the direction of parting the left- and right-side shutters from each other against the urging force of the coil spring. Thus, the disk cartridge is made small-sized while the width of the openings is increased by effectively utilizing the slidable range of the shutters as the openings are exposed. Moreover, a disk cartridge simple in construction can be provided without increasing the number of parts.

The third embodiment of the present invention will subsequently be described with reference to FIGS. 13 to 17. FIG. 13 is a perspective exploded view of a disk cartridge 110. As shown in FIG. 13, the disk cartridge 110 essentially consists of an upper case 101 and a lower case 102 which are coupled together and a disklike medium 104 which is rotatably mounted inside. The disklike medium 104 is a small-diameter high-density recording optical disk (more specifically, DVD) according to this embodiment and of a type capable of record-playback on both sides.

The upper case 101 and the lower case 102 are provided with substantially semicircular openings 111, 121 into which a driving shaft for rotatably driving the disklike medium 104 is inserted and substantially rectangular openings 112,122 into which a record-playback head for record-playback purposes is inserted. As the material of the upper case 101 and the lower case 102, acrylonitrile-budadiene-styrene (ABS) copolymers and the like are used. They are coupled by a securing means including screws or ultrasonic fusion bonding.

A shutter 105 is substantially U-shaped in cross section. The shutter 105 is formed with bisected shutters at the center of the disk cartridge 110, including a left-side shutter 151 and a right-side shutter 152. The shutters 151, 152 are so installed as to straddle the end portions on the front end sides of the respective upper and lower cases 101, 102. The leading end of each shutter is passed under a shutter guide 103 fitted to the case.

With respect to this optical disk, the shutter 105 is bisected to secure the size of each opening when the shutter is opened, because the size of the driving portion and a laser pickup becomes relatively large. Accordingly, compatibility of a standard-size disk cartridge large in diameter is effectively obtained.

The shutter 105 slidably mounted in the cases. The shutter 105 is composed of the left- and right-side shutters 151, 152 substantially U-shaped in cross section. Each of the left- and right-side shutters is composed of upper and lower plates for exposing and blocking up the openings and a coupling plate 155 for coupling them. These left- and right-shutters are fitted to the upper and lower cases 101, 102 to straddle these cases. Simultaneously, engaging protruded portions 153, 154 for engaging with a shutter on-off operating member P' of the record-playback machine are provided to the coupling plates 155 of the shutter 105 so as to effect the shutter on-off operation. Engaging recessed portions 113, 114 for receiving the shutter on-off operating member P' of the record-playback machine are provided in positions respectively correspond to the engaging recessed portions 153, 154 on the side face of the case opposite to the respective coupling plates 155 of the shutter 105 so as to maintain an error insertion preventive mechanism.

When it is attempted to insert the disk cartridge 110 into the record-playback machine reversely, the engaging recessed portions 113, 114 of the error insertion preventive mechanism are brought into contact with the shutter on-off operating member P' and do not allow the case to move. Consequently, the disk cartridge 110 is not forced into the record-playback machine any further.

Moreover, the edge faces of the engaging recessed portions 113, 114 in the direction of both end sides of the cases are formed into substantially vertical faces 113a, 114a. It is ensured that when the disk cartridge 110 is inserted improperly by mistake, the disk cartridge 110 is not allowed to enter the cases. Furthermore, edge faces opposite to the respective vertical faces 113a, 114a and closer to the center of the cases are formed into tilted faces 113b, 114b in order for the shutter on-off operating member P to be easily guided and led in. Accordingly, the error insertion preventive function is enhanced.

The formation of the engaging recessed portions 113, 114 over the whole width in the thickness direction of the cases on the rear end sides of the upper and lower cases 101, 102 makes it possible to form the PL plane in the mold with the same plane, whereby the mold can be simplified.

Sliders 161, 162 each having spring retaining portions 106 are provided to the respective left- and right-side shutters 151, 152 of the shutter. A tensile spring 107 is stretched between the spring retaining portions 166. Consequently, urge the left- and right-side shutters 151, 152 are urged in the direction of bringing the shutters close to each other.

Then the sliders 161, 162 are incorporated to engage with slide guide rails 124 on the inner faces of the respective upper and lower cases 101, 102 and to slide horizontally.

No error erasure preventive plug for selectively setting data-recording enable/disable on the disklike medium 104 is provided according to this embodiment. Such a plug may be provided as occasion demands. In the disklike medium 104 as what is designated to be capable of record-playback on both sides thereof according to this embodiment of the invention, the plug may be provided on both A and B sides.

When the shutter 105 is formed with the bisected left-and right-side shutters 151, 152 according to this embodiment, it has the following configuration. Namely, the sliders 161, 162 are provided on the inner face sides of the back portions of the respective left- and right-side shutters 151, 152. Simultaneously, by engaging the engaging portions formed on the sliders with the rails 124 formed in the cases, for example, groove portions in order to make the shutters 151, 152 slidable along the respective groove portions in the lateral direction. When the openings for receiving the driving shafts and the heads are exposed, the shutters are opened in the direction of laterally parting the shutter from each other. It is arranged that the distance W3 between the pair of engaging recessed portions 113, 114 into which the shutter on-off operating member P' of the record-playback machine is set equal to or greater than the distance W2 between the engaging protruded portions 153, 154 provided to the respective left- and right-side shutters 151, 152 to ensure the prevention of error insertion. Moreover, the distance W2 between the engaging protruded portions 153, 154 is set greater than the distance W1 between the pins of the shutter on-off operating member P'.

With respect to provision of the engaging recessed portions 113, 114, the error insertion preventive mechanism may be justified by not providing the pair of engaging recessed portions but only one of them, depending on the formation of the shutter on-off operating member P' of the record-playback machine.

If the shutter 105 is formed with one member apart from the bisect shutter 105, the error insertion preventive arrangement as previously noted may similarly be justified.

The engaging portions of the sliders 161, 162 project toward the upper and lower cases 101, 102 and engage with the groove-like rails 124 formed near the upper outer edges on the inner face sides of the respective upper and lower cases 101, 102, respectively. Furthermore, spring receiving retaining portions 106 are portions over which the leading end portions of a coil spring 107 are hooked.

When the upper case 101 and the lower case 102 are coupled together, the groove portions 124 of the upper and lower cases 101, 102 are arranged opposite to each other. Simultaneously, the engaging portions of the sliders 61, 62 enter these rails 124. Consequently, the shutters 151, 152 are made slidable along the respective rails 124. When the coil spring 107 is hooked over the spring receiving portions 106 of the shutters 151, 152, the left- and right-side shutters 151, 152 are urged in the direction of bringing the shutters close to each other. The coil spring 107 is positioned above and outside a region where the disklike medium 140 is placed and its expanding and contracting direction conforms to the direction of sliding the shutter 105.

Figures 14A, 14B, 14C:
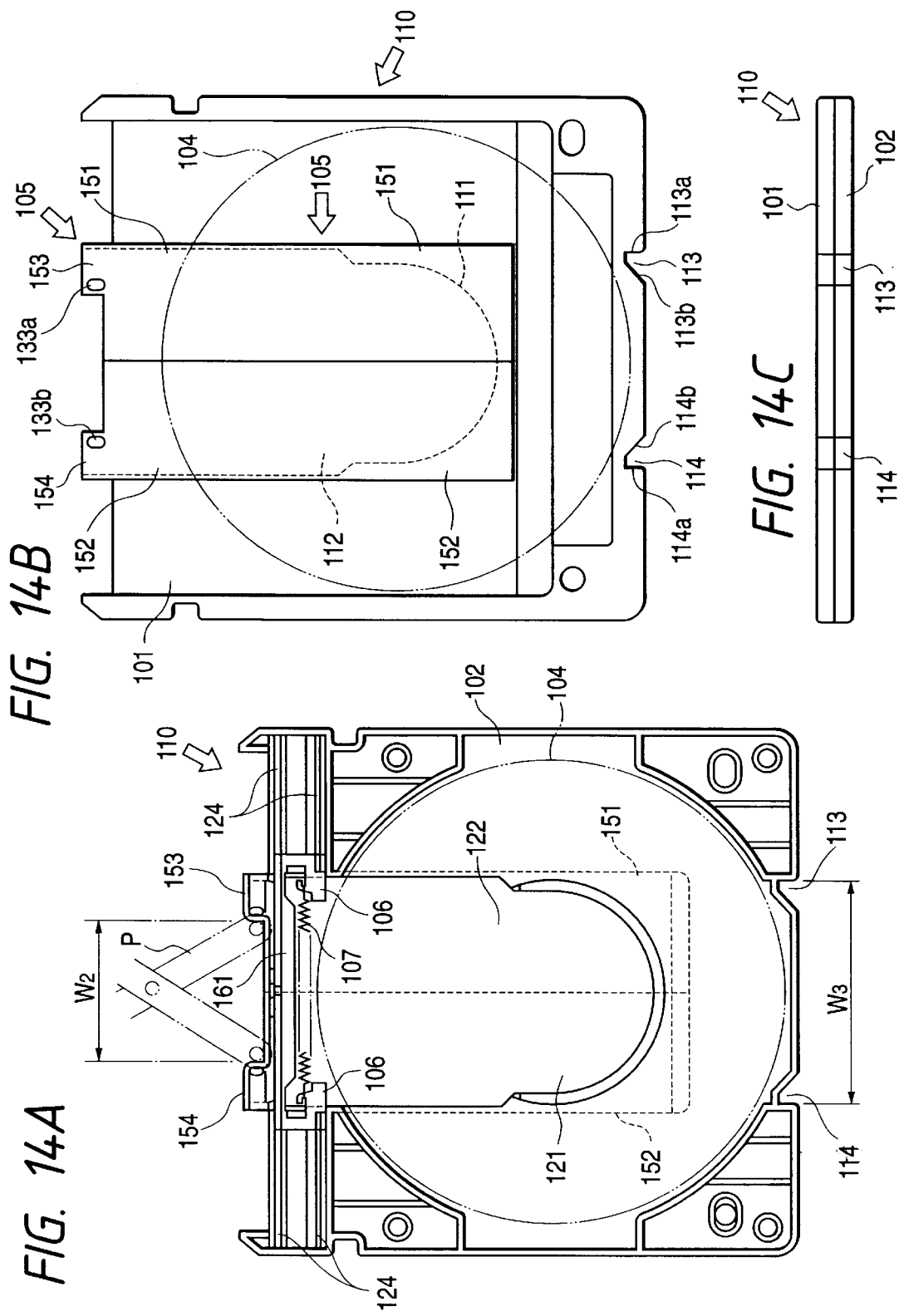
FIGS. 14A to 14C are diagrams illustrating the operating condition of shutters of the disk cartridge of FIG. 1.
Figure 15:
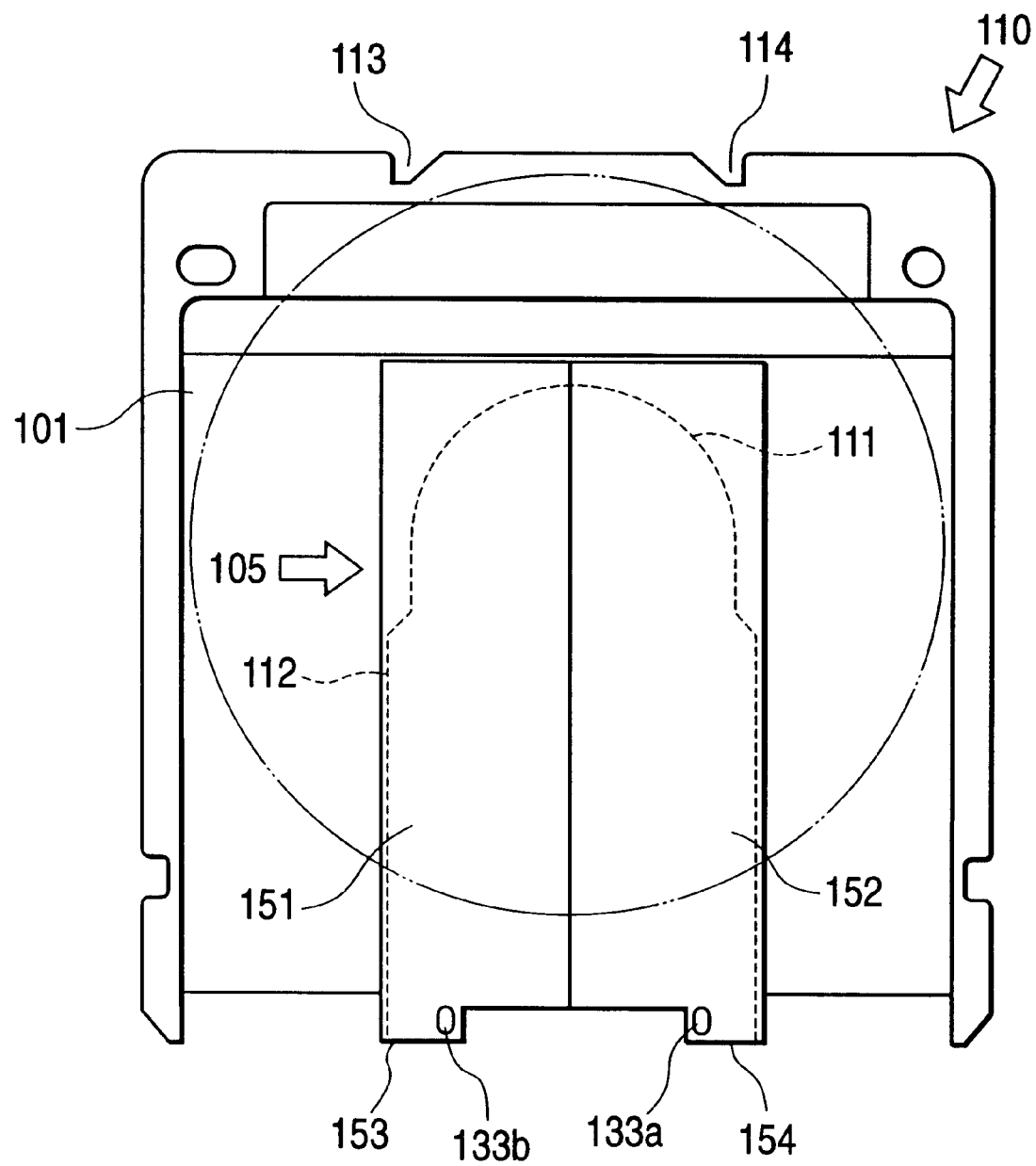
FIG. 15 is a plan view showing a case where the disk cartridge is mounted reversely in a record-playback machine.

When the shutter 105 is positioned so that the openings 111, 121 for receiving the driving shaft and the openings 112, 122 for receiving the head are blocked up, the engaging portions of the slider 105 are, as shown in FIG. 14, brought into contact with the end walls of the respective rails 124. Consequently, the shutter 105 is never allowed to move opposite further to the position where the openings are blocked up. Incidentally, the outer edge portions of the shutters 151, 152 may be caused only to abut each other instead without forming the stepped portions.

Figure 16A:
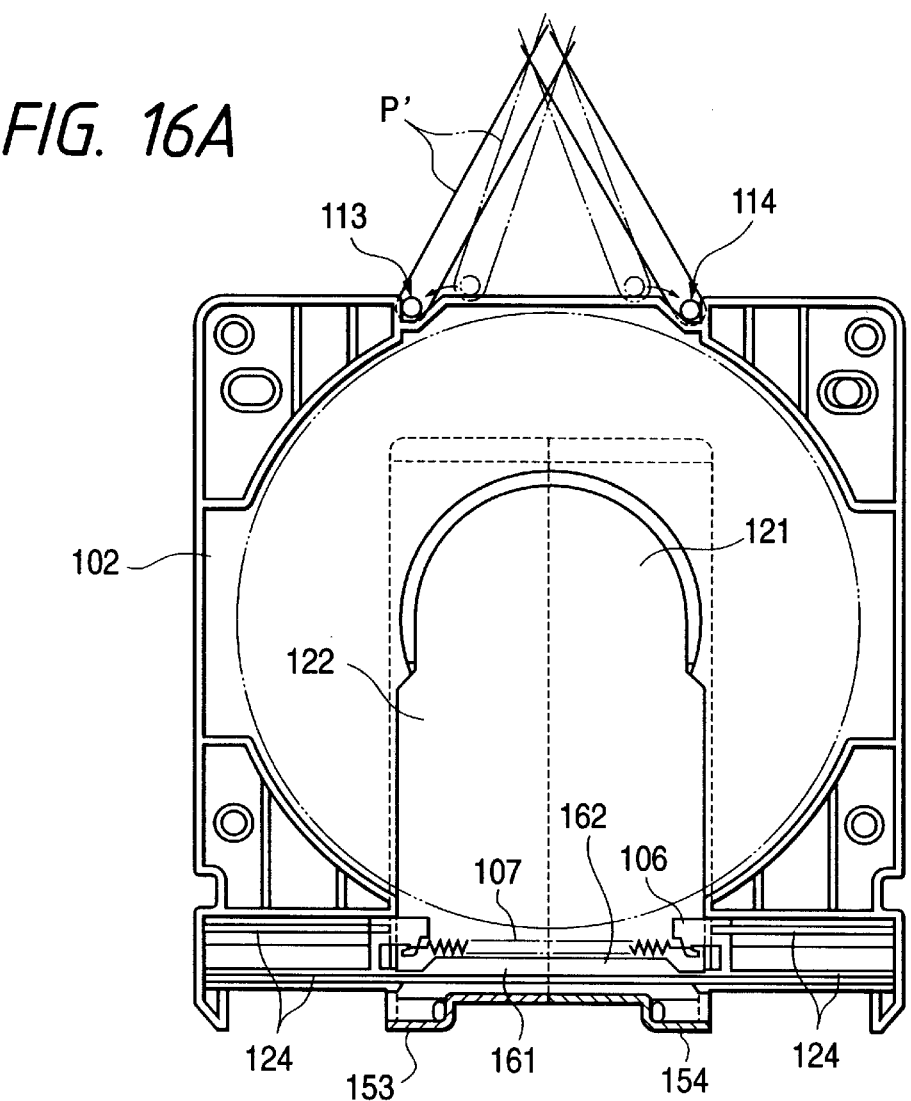
FIGS. 16A and 16B are diagrams illustrating the prevention of error insertion in the operating condition of FIG. 3.
Figure 16B:
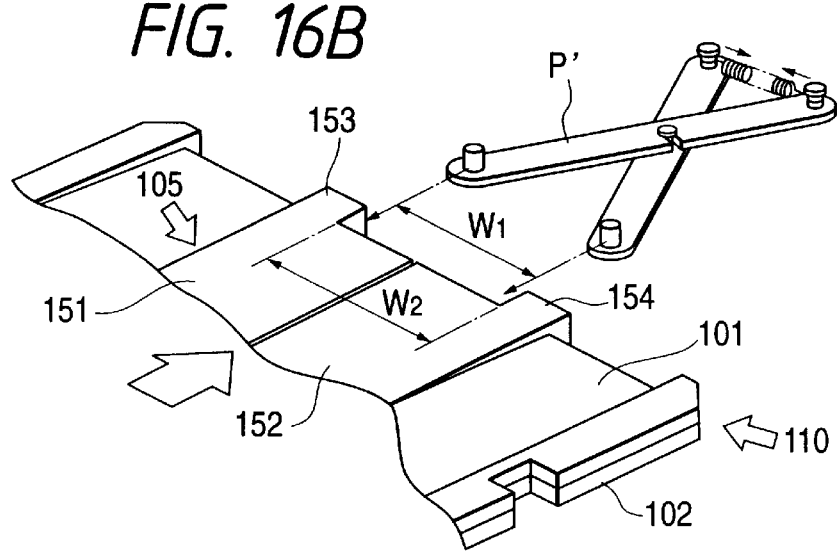
Figure 17:
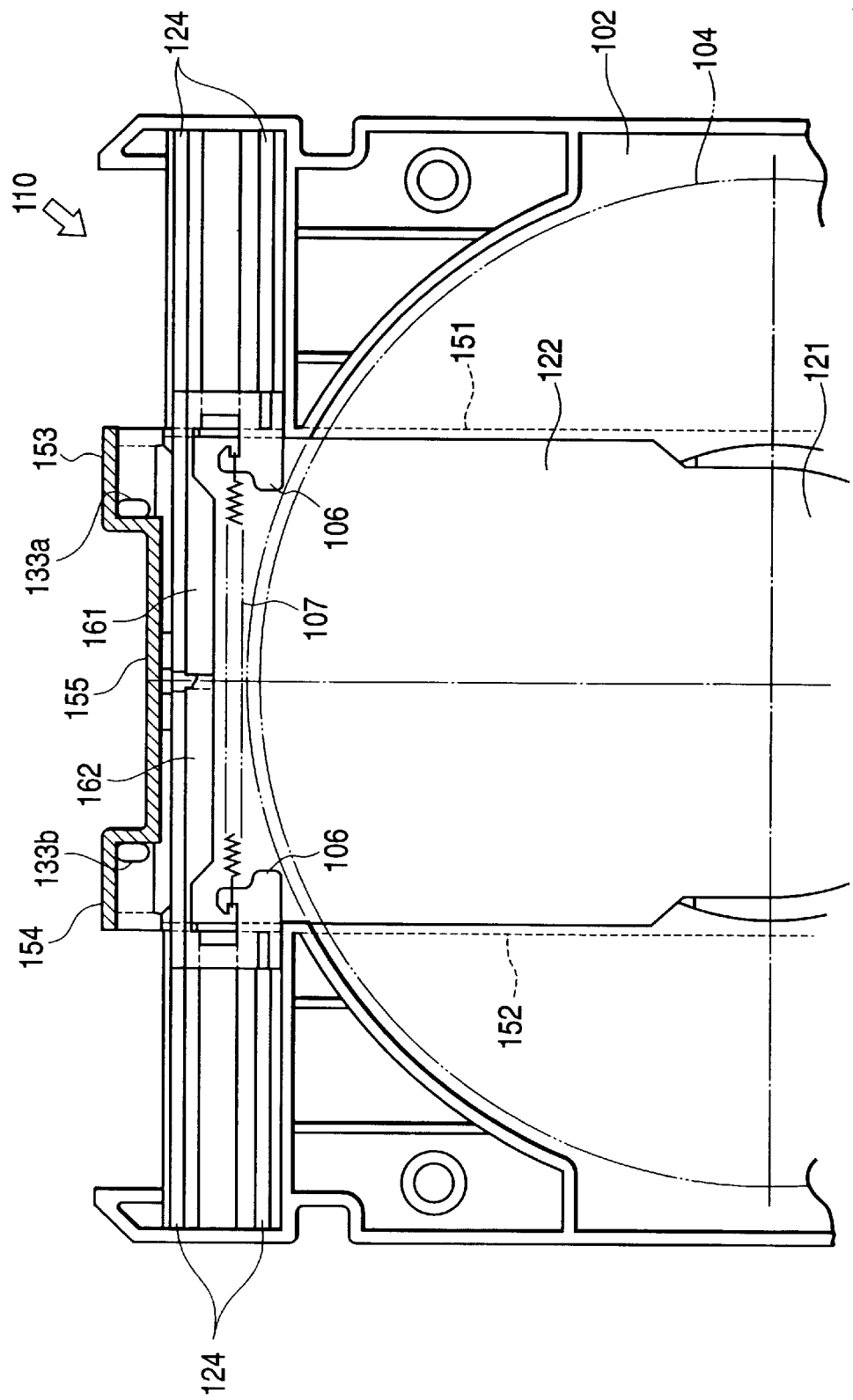
FIG. 17 is an enlarged partially cutaway plan view of FIG. 2.
Figure 18:
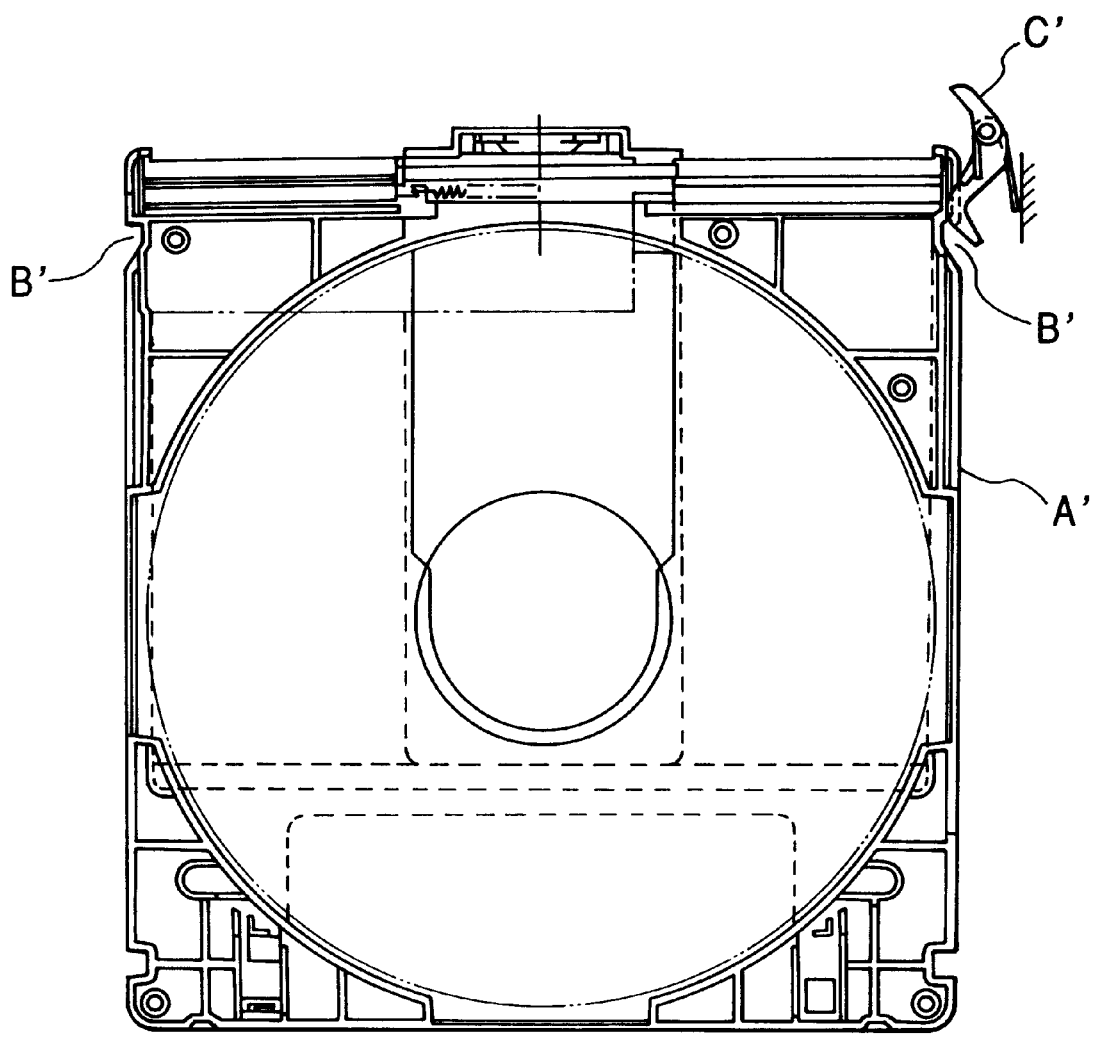
FIG. 18 is a plan view illustrative of a condition in which a conventional disk cartridge is inserted into a record-playback machine.

When the shutter 105 is opened, the shutter on-off operating member P', for example, pins provided on the record-playback machine side are, as shown in FIG. 16, positioned on the inside of the engaging protruded portions 153, 154 on the back of the respective upper and lower shutters 151, 152 in order to move the pins outside by abutting the respective engaging protruded portions 153, 154. Thus, the left- and right-side shutters 151, 152 are moved in the direction of parting the shutters from each other against the urging force of the coil spring 107, whereby the shutter 5 is opened. When the shutter 105 is closed, the aforesaid operation is performed reversely.

Although holes 133a, 133b into which the sliders 161, 162 fit are formed in the respective left- and right-side shutters 151, 152 so as to have these integrally assembled, the shutter 105 and the sliders 161, 162 may be formed by monolithic molding with only the coil spring 107 as an additional part necessary for exposing and blocking up the shutter 105, whereby to reduce the number of parts.

Although a description has been given of the preferred embodiments, the present invention is not limited to those as aforesaid but may be modified in various manners.

For example, this embodiment is also applicable to a type for exposing and blocking up the openings with one shutter, though an arrangement of bisected shutters has been taken by way of example according to the embodiment of the invention.

According to the third embodiment, in the disk cartridge for rotatably containing a disklike medium capable of record-playback, even when the disk cartridge is mounted in the record-playback machine reversely by mistake, the shutter on-off operating member of the record-playback machine is inserted into the engaging recessed portions of the cases with the effect of blocking the insertion of the disk cartridge to ensure that the error insertion is prevented. Moreover, the disk cartridge becomes usable with safety and reliability is far improved because it is easy to handle. As the shutter on-off operating member can be utilized effectively as the error insertion preventive mechanism in the record-playback machine, the disk cartridge is made simple in construction without employing extra mechanical parts and besides the cases of the disk cartridge are provided with the engaging recessed portions so that the parting line in the mold may be formed on the same plane. Therefore, the mold itself can be simplified with the effect of realizing a disk cartridge equipped with a low-cost error insertion preventive mechanism.

What is claimed is:

1. A disk cartridge comprising:
    a case for rotatably holding a disklike medium capable of record-playback therein and having openings into which a driving shaft and a record-playback head are inserted;
    a shutter which is slidably mounted in the case and substantially U-shaped in cross section, the shutter comprising an upper plate, a lower plate and a coupling plate for coupling the upper and the lower plates; and
    an error insertion prevention mechanism comprising an engaging protruded portion provided to the coupling plate and an engaging recessed portion provided on a side face of the case opposite to a side face having the coupling plate, said engaging recessed portion and said engaging protruded portion being located at equivalent positions on respective side faces when viewed from a vantage point located on a bisecting line perpendicularly extending from the respective side faces, the engaging protruded portion engaging with a shutter on-off operating member of a record-playback machine upon proper insertion of said disk cartridge, the engaging recessed portion receiving the shutter on-off operating member of the record-playback machine upon improper insertion of said disk cartridge.

2. A disk cartridge according to claim 1, wherein the shutter comprises a left-side and a right-side shutter; a slider is provided on an inner face side of the back portion of the respective left- and right-side shutters; engaging portions formed on the sliders are respectively engaged with groove portions formed in the case in order to make the sliders laterally slidable along the groove portions; the engaging recessed portion engaging with the shutter on-off operating member is provided to each of the respective left- and right-side shutters; and a distance between the engaging recessed portions engaging with the shutter on-off operating member of the record-playback machine is set equal or greater than the distance between the engaging protruded portions.

3. A disk cartridge according to claim 1, wherein the depth of the engaging recessed portion is equal to or greater than the height of the engaging protruded portion.

4. A disk cartridge according to claim 3, wherein the shutter comprises a left-side and a right-side shutter; a slider is provided on an inner face side of the back portion of the respective left- and right-side shutters; engaging portions formed on the sliders are respectively engaged with groove portions formed in the case in order to make the sliders laterally slidable along the groove portions; the engaging recessed portion engaging with the shutter on-off operating member is provided to each of the respective left- and right-side shutters; and a distance between the engaging recessed portions engaging with the shutter on-off operating member of the record-playback machine is set equal or greater than the distance between the engaging protruded portions.

* * * * *